United States Patent [19]

Santi

[11] Patent Number: 4,847,975

[45] Date of Patent: Jul. 18, 1989

[54] BORING TOOL FOR MACHINE TOOL

[75] Inventor: Roger J. Santi, Fond du Lac, Wis.

[73] Assignee: AMCA International Corporation, Hanover, N.H.

[21] Appl. No.: 251,184

[22] Filed: Sep. 29, 1988

Related U.S. Application Data

[62] Division of Ser. No. 48,569, May 11, 1987, Pat. No. 4,793,748.

[51] Int. Cl.$^4$ ............................................. B23P 17/02
[52] U.S. Cl. .................................... 29/428; 29/458; 29/DIG. 1; 407/45; 407/88; 408/158; 408/161; 408/168
[58] Field of Search .................. 29/428, 458, DIG. 1; 411/258; 156/293, 294; 408/158, 161, 168; 407/45, 88

[56] References Cited

U.S. PATENT DOCUMENTS

| | | | |
|---|---|---|---|
| 1,872,667 | 8/1932 | Bryant. | |
| 2,042,257 | 5/1936 | Harrison et al. | 51/165 |
| 2,457,040 | 12/1948 | Penn-Gaskell Hall | 82/1.2 |
| 2,632,956 | 3/1953 | Crosby | 33/174 |
| 2,831,387 | 4/1958 | Ovshinsky | 82/24 |
| 2,998,737 | 9/1961 | Yogus et al. | 77/76 |
| 3,178,969 | 4/1965 | Yogus et al. | 77/58 |
| 3,254,548 | 6/1966 | Gersch | 77/58 |
| 3,279,285 | 10/1966 | Ivins | 77/1 |
| 3,324,529 | 6/1967 | McCreery | 407/74 |
| 3,499,352 | 3/1970 | Milewski et al. | 77/58 |
| 3,635,572 | 1/1972 | Robinson | 408/181 |
| 3,730,636 | 5/1973 | Mizoguchi | 408/168 |
| 3,740,161 | 6/1973 | Milewski | 408/158 |
| 3,899,724 | 8/1975 | Colton | 318/162 |
| 3,914,678 | 10/1975 | Chynoweth et al. | 318/568 |
| 4,055,386 | 10/1977 | Chynoweth et al. | 408/13 |
| 4,118,139 | 10/1978 | Lemelson | 408/12 |
| 4,181,958 | 1/1980 | Juengel et al. | 364/560 |
| 4,193,039 | 3/1980 | Massa et al. | 328/162 |
| 4,204,782 | 5/1980 | Spits et al. | 408/3 |
| 4,207,567 | 6/1980 | Juengel et al. | 340/680 |
| 4,223,260 | 9/1980 | Beer et al. | 318/696 |
| 4,268,783 | 5/1981 | Murray | 318/565 |
| 4,354,305 | 10/1982 | Plummer et al. | 29/568 |
| 4,400,118 | 8/1983 | Yamakage et al. | 408/3 |
| 4,412,465 | 11/1983 | Wright | 82/1.2 |
| 4,416,569 | 11/1983 | Yamakage et al. | 408/4 |
| 4,473,937 | 10/1984 | Ortlieb | 29/568 |
| 4,648,757 | 3/1987 | Plummer | 408/12 |

FOREIGN PATENT DOCUMENTS

| | | |
|---|---|---|
| 0043920 | 2/1982 | European Pat. Off. . |
| 2012642 | 10/1971 | Fed. Rep. of Germany . |
| 2123272 | 9/1972 | France . |
| 629040 | 10/1978 | U.S.S.R. . |
| 560119 | 3/1944 | United Kingdom . |
| 902582 | 8/1962 | United Kingdom . |
| 1002497 | 8/1965 | United Kingdom . |
| 1363851 | 8/1974 | United Kingdom . |
| 2024671 | 1/1980 | United Kingdom . |
| 1573194 | 6/1980 | United Kingdom . |
| 1603727 | 11/1981 | United Kingdom . |
| 2131332 | 6/1984 | United Kingdom . |

OTHER PUBLICATIONS

"Telemetry Gage System" brochure, dated Sep. 1980, of the Valeron Corporation.
"Speed Auto-Compensation System" brochure of Aug. 10, 1981, of the Valeron Corporation.
"Machine Tool Checks Up on Itself", *Machine Design* reprint, Apr. 22, 1976.

(List continued on next page.)

*Primary Examiner*—P. W. Echols
*Assistant Examiner*—Kevin Jordan
*Attorney, Agent, or Firm*—Burns, Doane, Swecker & Mathis

[57] ABSTRACT

A boring tool is made from simple bar stock without significant external machining of the tool body. By providing a longitudinal bore which intersects a transverse slot, a longitudinally slidable wedge with splines can cooperate with a disc carried by a tool bar slidably received in the transverse slot. To ensure the most precise alignment between splines of the wedge and splines of a cooperating disc in the tool bar, the disc of the tool bar is attached to the tool bar with epoxy cement while the splines of the disc are engaged with the splines of the wedge. With the splines of the wedge being angularly offset from the longitudinal axis of the wedge, translation of the wedge will ensure accurately controlled movement of the tool bar.

1 Claim, 4 Drawing Sheets

OTHER PUBLICATIONS

Vasilash, "Accurate Bores from Automatic Adjustment", *Manufacturing Engineering*, Apr. 1980.

Kamset Automatic Size Control System brochure of the Valeron Corporation, Aug. 1978, publn. KA-102.

Lipp, "Wear Compensation When Producing High-Precision Bores", *Industrial & Production Engineering*, published prior to Jul. 11, 1985.

Sandvik brochure "Machining Systems-Functional Description Sandvik Autocomp System-Control Units, Compensators, Tooling".

Genicon+Samsomatic Ltd. brochure "Our Tool Correction Systems", dated Aug. 1980.

Renishaw brochure, "3Dimensional Touch Trigger Probes for Machining Centres and Lathes".

"Flexible Manufacturing: The Technology Comes of Age", *Iron Age*, Sep. 7, 1981.

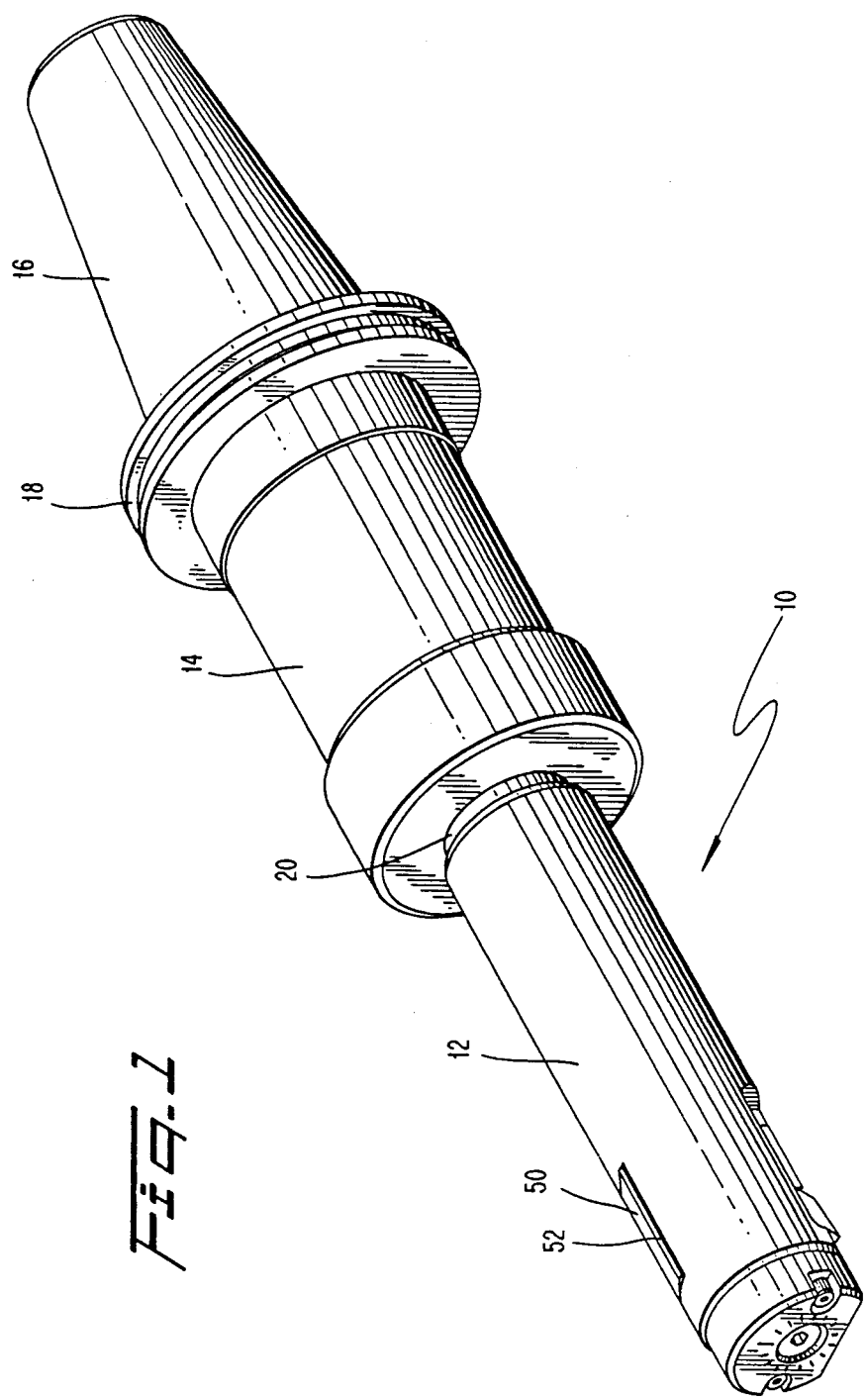

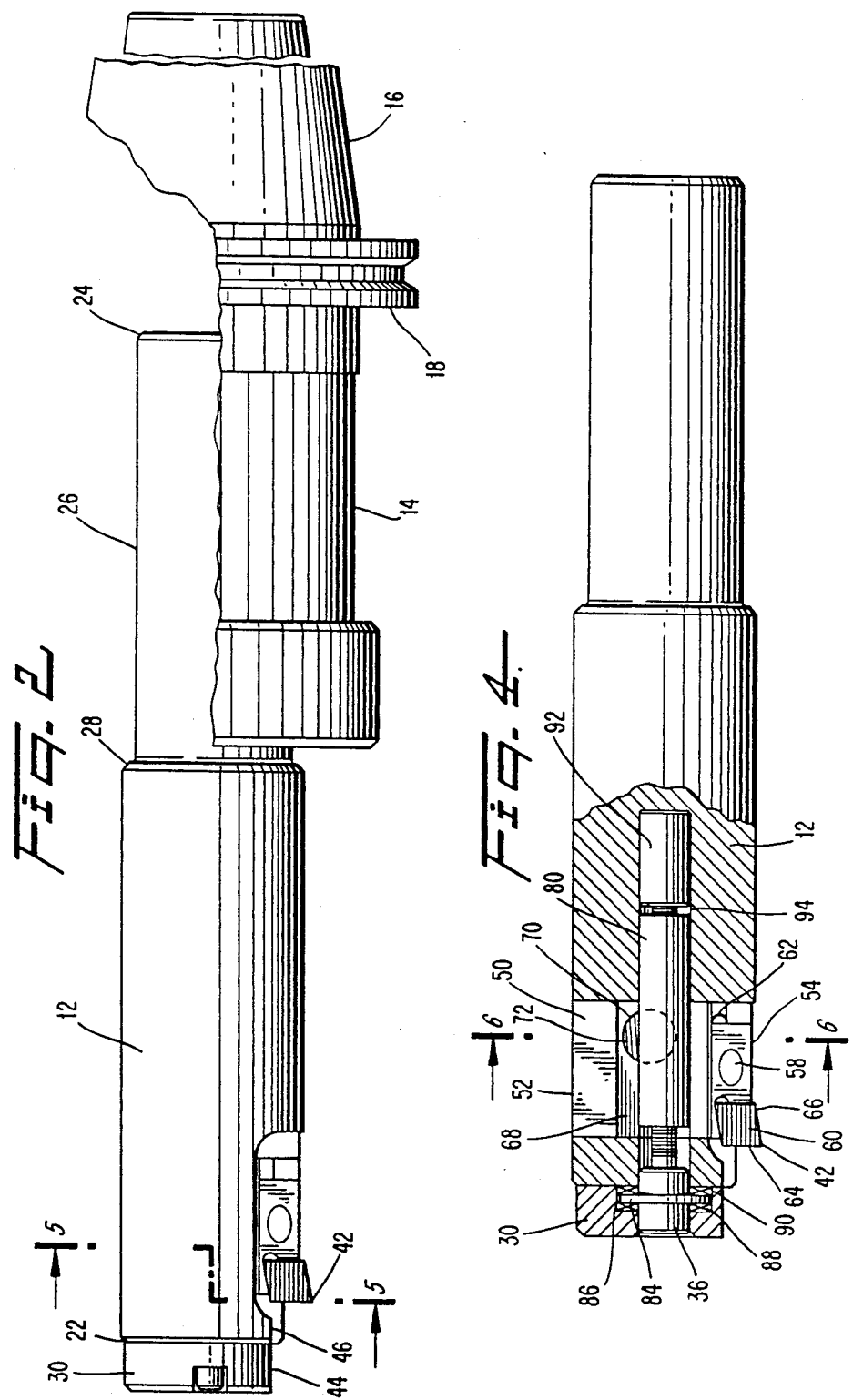

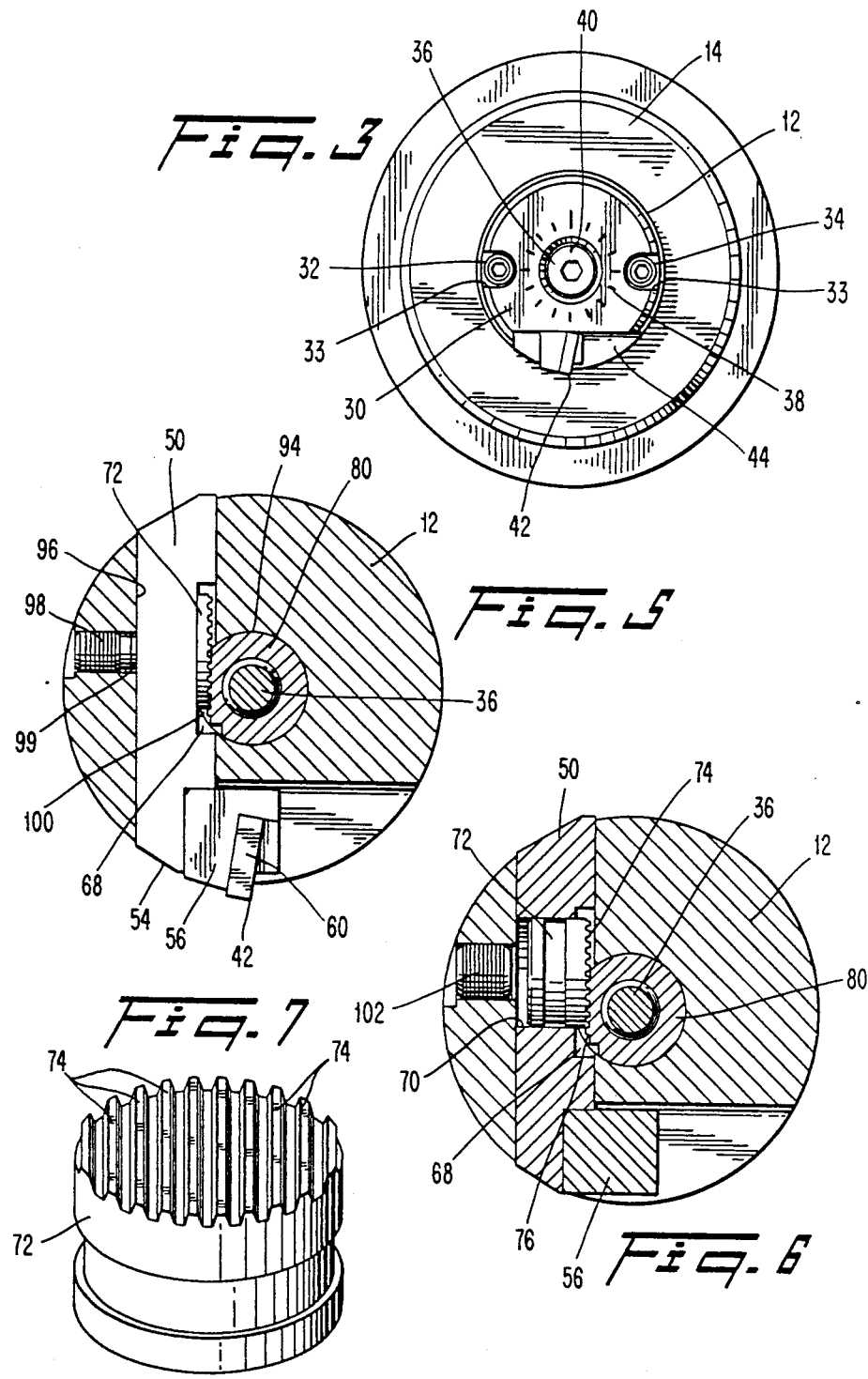

BORING TOOL FOR MACHINE TOOL

This application is a divisional, of application Ser. No. 48,569, filed May 11, 1987, now U.S. Pat. No. 4,793,748.

CROSS-REFERENCES TO RELATED PATENT APPLICATION

Pending U.S. patent application Ser. No. 442,625, of Harvey R. Plummer, was filed Nov. 18, 1982, for a Precision Adjustment System for Boring Tools and is considered to be broadly related to the present invention.

TECHNICAL FIELD

The present invention relates generally to boring tools of the type suitable for use in connection with machining centers, numerically-controlled machine tools and the like. In particular, the present invention deals with an improved design for a boring tool which results in a more accurate tool.

BACKGROUND

In the past, boring tools for use with numerically controlled machine tools have been known. The boring tool is typically used when it is necessary to machine a cylindrical opening in a block of metal so that a finished, machined part can be provided. Generally speaking, a boring tool is different from a drilling tool: the drilling tool a removes metal to define a generally cylindrical opening in the part; whereas, the boring tool operates on an existing cylindrical opening to create a finished opening which has much better tolerances on roundness of the opening and cylindricalness of the opening.

In some cases, the bore must be perfectly cylindrical from one end to the other. In other cases, the bore has changes in its diameter at predetermined locations along the length of the bore. One very common example of such a change in diameter is a counterbore at the entrance to the opening.

In order for a boring tool to be useful in a machine tool so that the boring tool can machine a cylindrical bore with the necessary diameters and tolerances, it is of course necessary that such a boring tool be capable of very accurate adjustment in both the axial direction (along the longitudinal axis of the boring tool) and in the radial direction.

In the past, suitable boring tools have been carefully machined with a high degree of precision in longitudinal and radial adjustability. For example, it is known to carefully machine a generally square piece of material with a rectangular bore extending longitudinally and essentially tangential to a transverse slot in which a tool bar is slidable received. The rectangular bore receives a wedge assembly which includes a wedge and closely fitted bearing shoes which guide the wedge during longitudinal movement. Longitudinal movement of the wedge is transformed into radial movement of the tool bar through cooperation of splines on the wedge with splines on the tool bar.

. Control on the accuracy of movement of the tool bar depends on the precision with which the cooperating splines can be fitted together. Moreover, to the extent that precise fitting of the splines is not obtained, unacceptable tolerances will rapidly develop as a result of wear caused by use of the tool.

In addition to such alignment problems, known boring tools require a large number of pieces each of which requires precise machining. For example, the tool body itself is often machined as is the wedge, its guides, the tool bar and cooperating structures. As is well known, the expense of producing any part is a function of the number and precision of machining operations which are required to make the part. Accordingly, the known boring tools are known to be economically expensive.

It would, naturally, be advantageous to have a boring tool in which alignment of the driving splines could be accurately controlled during manufacture. In like fashion, it would be advantageous to have a boring tool in which the number of precision machining operations could be significantly reduced so that the boring tool could be manufactured more economically.

Accordingly, it is seen that the need continues to exist for a new boring tool which overcomes problems of the type discussed above.

SUMMARY OF THE INVENTION

To overcome the problems of the prior art boring tools, the tool body is provided with a longitudinal bore to receive a wedge and a transverse slot to receive a tool bar. There is a slight overlapping relationship between the slot and the bore such that a common volume is defined by the slot and the bore. The wedge is cylindrical in cross-sectional shape and has a flat side with splines which protrude into the common volume of between the bore and the slot. The tool bar has a cooperating splined surface which protrudes into the common volume between the bore and the slot and which mates with the splines of the wedge in that location. With the splines of the wedge being positioned at a predetermined angle to the axis of the wedge, longitudinal movement of the wedge is translated into radial movement of the tool bar. Means for moving the wedge are provided on the boring tool also. The wedge moving means may, for example, be a screw having a fine pitch on which the wedge is threadably mounted within the longitudinal bore.

To reduce the number of machined parts that would otherwise be required, the tool body may be made from a simple piece of circularly cylindrical bar stock. The only machining operations required for the external contour of the tool body are those machining operation necessary to prepare the tool body to receive the tool bar, the adjusting wedge, and the end to mate with the tool holder.

So that the splines of the tool bar can be most accurately mated with cooperating splines of the wedge, the boring tool can be provided with a means for minimizing the clearance between the splines of the wedge and the splines of the tool bar. Such a device can be a simple screw disposed perpendicularly to the plane of the slot and having a low friction material on the end thereof in contact with the tool bar. With this arrangement, the tool bar can be biased toward tight engagement with the splines of the wedge to minimize the effect of manufacturing tolerances on accuracy of the boring tool.

To conveniently assemble the wedge and the tool bar such that the cooperating splined surfaces have the best possible relationship, the splined surface of the tool bar can be provided on a generally circular disc which is received in a cooperating bore of the tool bar. By attaching the disc to the tool bar with a suitable epoxy cement and by positioning the wedge in contact with the splines of the disc while the epoxy is still wet and maintains that relationship under pressure provided by the take up screw, the splines of the wedge and the splines of the disc are positioned to give the best possible coordination therebetween.

BRIEF DESCRIPTION OF THE DRAWINGS

Many objects and advantages of the present invention will be apparent to those skilled in the art from the accompanying drawings wherein like reference numerals have been applied to like elements and wherein:

FIG. 1 is a perspective view of a boring tool of the present invention;

FIG. 2 is a side elevational view of the boring tool of FIG. 1;

FIG. 3 is an end elevational view of the boring tool of FIG. 1;

FIG. 4 is a side elevational view of the tool body of FIG. 2 with portions broken away to illustrate positional arrangement of the tool bar;

FIG. 5 is a partial cross-sectional view taken along the line 5—5 of FIG. 2, in an enlarged scale;

FIG. 6 is a partial cross-sectional view taken along the line 6—6 of FIG. 4, in an enlarged scale;

FIG. 7 is an enlarged perspective view of the disc of the present invention.

DESCRIPTION OF THE PREFERRED EMBODIMENT

Figure 8:
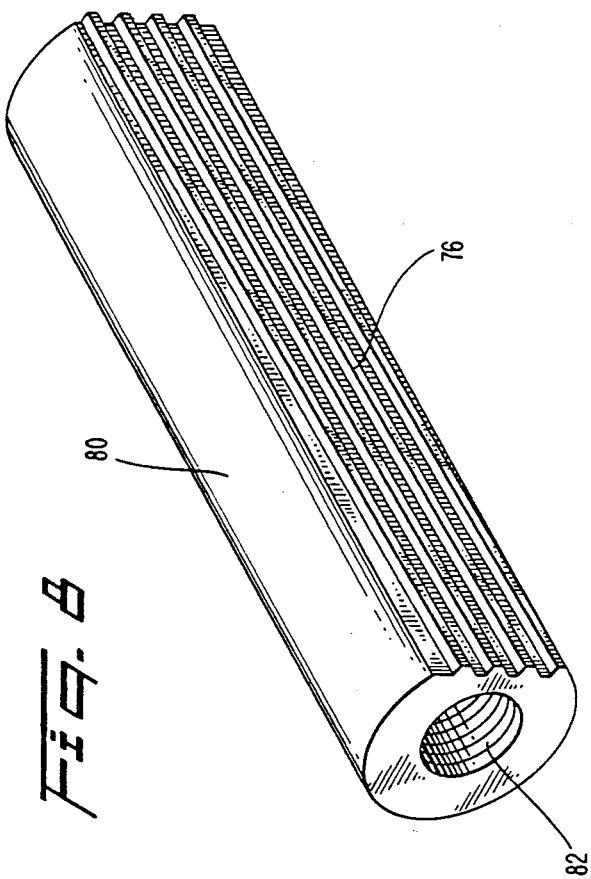
FIG. 8 is an enlarged perspective view of the wedge of the present invention.

According to the present invention, a boring tool 10 (see FIG. 1) is connected to a collet tool holder 14. The collet tool holder 14 is a conventional device for attaching a machine tool, such as the boring tool 10, to a numerically controlled machine. The collet tool holder 14 typically includes a frustoconical portion 16 having a taper which matches the taper of a driving spindle (not shown) of the numerically controlled machine. In addition, the collet tool holder 14 may have a drive collar 18 adjacent to the frustoconical portion 16 which can be placed in driven relationship to the numerically controlled machine tool so as to be driven thereby.

Extending inwardly from one end of the collet tool holder 14 is a bore 18 which is sized, both in diameter and in length, to receive an end of a machine tool such as the boring tool 10. The tool body 12 is secured to the collet tool holder 14 in a suitable conventional manner. Accordingly, when the collet tool holder 14 is driven, the tool body 12 is simultaneously driven.

The tool body 12 has a distal end 22 (see FIG. 2) and an opposite end 24 which is received in the bores of the collet tool holder 14. Immediately adjacent to the opposite end 24 is a cylindrical stud 26 which may be set off from the main portion of the tool body 12 by a shoulder 28. Significantly, the tool body 12 may be fabricated from a circularly cylindrical piece of high grade tool steel bar stock. The stud 26 can be made by a simple turning operation. The shoulder 28, as well as the distal end 22 and the opposite end 24 may be chamfered as desired to relieve stresses.

At the distal end 22, a collar 30 is provided from which radial adjustment of the boring tool can be effected. On each side of the collar (FIG. 3) a recess 33 is provided. These recesses 33 receive corresponding bolts 32, 34 which attach the collar 30 to the distal end of the tool body 12. At the center of the collar 30 is an adjusting screw 36. This adjusting screw 36 has a head with a suitable conventional opening to receive a cooperating tool to rotate the adjusting screw 36. Conveniently, the head of the adjusting screw 36 may have a hexagonal opening adapted to receive an allen wrench or comparable tool.

In addition, the collar 30 may be provided with an adjustment scale 38 which is graduated so as to provide a visual indication of the adjusted position of the adjusting screw 36. The scale 38 has a central mark as does the adjusting screw 36 have a central mark 40 so that relative position of the adjusting screw 36 and the collar 30 can be visually identified.

The boring tool 10 also has a cutting edge 42 which is operable to cut metal. In addition, the cutting edge 42 is positioned relative to the center of the boring tool 10 so that it projects beyond the external surface of the tool body 12. Unless this relationship is provided, the cutting edge 42 could not perform its intended function, i.e., the cutting edge must extend radially beyond the circumference of the tool body 12.

The collar 30 has a flattened, undercut portion 44 adjacent to the cutting edge 42. This undercut portion 44 is in general longitudinal alignment with an undercut portion 46 of the tool body 12 itself (see FIG. 2). The undercut portion 46 of the tool body 12 extends in a direction generally transverse to the longitudinal direction of the tool body 12. These two undercut portions 44, 46, cooperate to define an area where chips and swarf from the cutting operation can accumulate without interfering with operation of the boring tool 10.

The undercut portion 46 of the tool body 12 exposes an end 54 (see FIG. 4) of the tool holder 50. Another end 52 of the tool bar is exposed at the opposite side of the tool body 12 (see FIGURE 1). At the end 54 (see FIG. 5), the tool bar 50 is provided with a tool cartridge 56 which carries a cutting element 58 having the cutting edge 42. The tool cartridge 56 is attached to the tool bar 50 by a suitable threaded fastener 58 (see FIG. 4). To securely hold the cartridge 56 against the tool bar 50 so that the cartridge 56 is restrained against rotation in the plane of the tool bar 50 and so that the cartridge 56 is constrained against tipping forwardly out of the plane of the tool bar 50, the cartridge 56 may have a base which is configured so as to key into the tool bar 50. For example, the cartridge 56 may include an ear 62 which extends laterally into a conforming recess of the tool bar 50, the ear extending from the top of the cartridge 56 to the bottom thereof so as to present a semicylindrical projection. Thus the ear 62 is keyed into the conforming recess of the tool bar 50 when the cartridge is held is place by the threaded fastener 58 and helps to hold the cartridge 56 against rotation in the plane of the tool bar 50 as well as against tipping forwardly about an axis lying in the plane of the tool bar 50.

On the side of the cartridge 56 opposite from the ear 62, the cartridge 56 includes a cutting element 60. This cutting element 60 is fabricated from a suitable conventional material adapted for cutting metal (e.g., industrial diamond) and may be purchased as an insert from any of a variety of commercial sources, e.g. the Carboloy company. Generally, the cutting element 60 has a side surface 64 which lies in a generally radial plane that intersects a second side surface 66 at the cutting edge 42 with a dihedral angle that is less than 90°. With this relationship, the cutting element 60 can bore an accurate surface with a high degree of precision.

A channel 68 is provided on the top surface of the tool bar 50 at a location between the two ends 52, 54. This channel has a width measured in the direction of travel of the tool bar 50 which is greater than the maximum radial travel allowed for the tool bar 50. In the channel 68 there is an opening 70 which is located to one side of the longitudinal axis of the tool bar 50. Preferably, the opening 70 is generally cylindrical (see FIGURE 6). The opening is shaped to receive a conformingly shaped disk 72. This disc 72 (see FIG. 7) has a generally planar top surface having a plurality of parallel splines 74. When the disc 72 is secured to the tool bar 50 as described below, the disc 72 is operable to translate the tool bar 50 in the radial direction of the boring tool.

The tool bar 50 (see FIG. 5) is provided with a slot 96 which extends transversely therethrough to receive the tool bar 50. Since the slot serves to guide the tool bar during radial adjustments thereof, the cross sectional shape of the tool bar 50 conforms to the cross-sectional shape of the slot 96. As the tool bar 50 is generally rectangular in cross-sectional shape, the slot 96 is also generally rectangular. On the back side of the tool bar 50, a take-up screw 98 is provided which has a resilient, low friction material that abuts the back side of the tool bar 50 at a position adjacent to the longitudinal centerline of the tool bar 50. Accordingly, with the opening 70 (see FIG. 6) offset from the centerline of the tool bar 50, the take-up screw 98 (see FIGURE 5) will always bear against a flat surface. The take up screw 98 is operable to bias the tool bar 50 into engagement with the opposite side of the slot 96 so that the splines of the disc 72 can be maintained in intimate contact with the splines of the wedge 80. It will also be noted that the lands on the top of the tool bar 50 must be in contact with the top of the slot 96 throughout permissible radial excursions of the tool bar 50 so that the tool bar 50 does not tilt in the slot.

As shown in FIG. 6, the splines 74 of the disc 72 engage conformingly shaped splines 76 provided on a generally cylindrical wedge 80. The splines 76 (see FIG. 8) are provided on a flat side of the wedge 80 and are disposed at a small angle relative to the axis of the wedge. This small angle is carefully selected such that movement of the wedge 80 along its longitudinal axis will result in a precisely controlled movement of the tool bar 50 in the radial direction. For example, when the splines 76 are inclined at an angle of, say, 6°50' 40" relative to the longitudinal axis, a longitudinal movement of the wedge through 1/24th in. will result in a radial movement of the tool bar 50 through 0.005 in. It will also be noted that (a) the angle between the splines 76 and the axis, (b) the length of the wedge 80, and (c) the diameter of the disc 72, control the radial limits of movement of the tool bar 50.

To adjust the axial position of the wedge 80, the wedge has a bore 82 extending from one end of the wedge to the other, the bore having a fine machine screw thread. For example, a thread with a pitch of 24 threads per inch is suitable for the machine screw thread of the bore. The threaded bore 82 receives the adjusting screw 36 (see FIG. 4) which has a complementary external thread thereon. So that the adjusting screw 36 is rotatably mounted and precisely positioned relative to the tool bar 50, the adjusting screw 36 has a head with a radially extending flange 84 that is received in a counterbore 86 of the collar 30. The flange 84 is sandwiched between a pair of suitable conventional thrust bearings in the counterbore, with the entire assembly being held together by the cap screws 32, 34 (see FIG. 3).

In order to limit the longitudinal excursions of the wedge 80, a resilient limit stop 92 (see FIG. 4) is positioned at the bottom of the longitudinal bore 94 which slidably receives the wedge 80. The stop 92 prevents the splines of the wedge 80 and the splines of the disc 72 from being disengaged when the wedge is at its innermost position. The head of the adjusting screw 36 itself functions as a stop to limit the excursion of the wedge 80 in the opposite direction along the longitudinal axis. Thus, it is seen that the adjusting screw 36 and the internal threads of the wedge comprise a means for adjusting the longitudinal position of the wedge within the longitudinal bore 94 of the tool bar 50.

It will be noted from FIG. 5 that longitudinal bore 94 within which the wedge 80 is longitudinally movable intersects the transverse slot 96 which receives the tool bar 50 such that there is an interfering volume 100 defined by that intersection. The splines of the wedge project into that interfering volume 100. Likewise, the splines of the disc project into that interfering volume. Moreover, the planar shape of the top surface of the disc 72 provides a bearing against which the flat side of the wedge 80 can bear. Thus, the wedge is self reacting and it is not necessary to provide the wedge 80 with a polygonal cross sectional shape to prevent it from turning in the longitudinal bore.

It will, of course, be apparent that precision alignment of the splines in the disc and the splines of the wedge is important to accurate control of the radial position of the tool bar 50 and the associated cutting edge 42. Accordingly, another aspect of the present invention is a method of assuring that those two sets of splines are precisely positioned relative to one another. To this end, the side surface of the disc 72 has an epoxy cement applied thereto. The splines of the disc are arranged to be generally transverse to the longitudinal direction of the tool bar 50. Then the tool bar 50 is inserted into the slot 72.

A back-up screw 102 is provided in the tool bar 50 which is aligned with the opening in the tool bar 50 that receives the disc 72. When the back-up screw is advanced into engagement with the bottom of the disc 72, the disc 72 is advanced so that its splines engage the splines of the wedge 80. By longitudinally moving the wedge back and forth along the longitudinal axis, the splines of the wedge and the splines of the disc become aligned. Then, with further advance of the back-up screw 102, the disc moves into the best possible alignment with the wedge. After the epoxy cement has cured, the back-up screw is withdrawn to a position where it will not interfere with the radial movement of the tool bar 50.

A boring tool manufactured according to this invention has numerous advantages over the known boring tools. For example, the tool body itself can be fabricated from standard stock. Thus, machining operations to prepare the stock for use as a tool are eliminated.

Another economy provided by a boring tool according to this invention is the simplicity with which the wedge and the cooperating disc can be made and assembled. For example, the wedge can be essentially cylindrical and can slide in a simple longitudinal bore. The disc can be mounted in a simple cylindrical bore through the tool bar 50. Thus, simple machining operations can be used to make the necessary elements. Guide shoes are eliminated. Square or rectangular openings are eliminated. And, alignment between the mating splines of the wedge and the disc can be assured with a high degree of accuracy and a high degree of reliability.

While the invention has been particularly shown and described with respect to a preferred embodiment thereof, it will be understood by those skilled in the art that changes in the form and details of the foregoing may be made therein without departing from the spirit and scope of the invention.

Having thus described the invention, what is claimed as new, and desired to be secured by Letters Patent is:

1. A method of precisely aligning an adjusting member in a tool bar of a boring tool, comprising the steps of:
   applying an epoxy cement to a surface of a rotationally symmetric member having a splined surface;
   positioning the rotationally symmetric member in an opening of a tool bar;
   mating the splined surface of the member with a conformingly splined surface of a longitudinally adjustable wedge; and
   allowing the epoxy cement to harden to accurately position the member relative to the wedge.

* * * * *